United States Patent
Ohguro

(10) Patent No.: US 8,290,312 B2
(45) Date of Patent: Oct. 16, 2012

(54) INFORMATION PROCESSING APPARATUS, METHOD OF PROCESSING INFORMATION, CONTROL PROGRAM, AND RECORDING MEDIUM

(75) Inventor: Yoshihisa Ohguro, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 802 days.

(21) Appl. No.: 12/475,881

(22) Filed: Jun. 1, 2009

(65) Prior Publication Data

US 2009/0296124 A1   Dec. 3, 2009

(30) Foreign Application Priority Data

Jun. 3, 2008   (JP) ................................. 2008-146115

(51) Int. Cl.
*G06K 9/03* (2006.01)

(52) U.S. Cl. ......... 382/309; 382/310; 382/305; 358/1.9; 358/504

(58) Field of Classification Search ............... 382/309, 382/310, 305; 358/1.9, 1.15, 504, 406; 235/437; 708/530; 345/589, 590
See application file for complete search history.

(56) References Cited

U.S. PATENT DOCUMENTS

| | | | |
|---|---|---|---|
| 5,604,853 A | 2/1997 | Nagashima | |
| 2006/0215909 A1* | 9/2006 | Itonori et al. | 382/176 |
| 2006/0217955 A1* | 9/2006 | Nagao et al. | 704/2 |
| 2006/0288279 A1* | 12/2006 | Yacoub et al. | 715/530 |

FOREIGN PATENT DOCUMENTS

| | | |
|---|---|---|
| EP | 0 115 947 A2 | 8/1984 |
| EP | 0 115 947 A3 | 8/1984 |
| JP | 5-266074 | 10/1993 |
| JP | 5-266075 | 10/1993 |
| WO | WO 2004/012099 A2 | 2/2004 |
| WO | WO 2004/012099 A3 | 2/2004 |

OTHER PUBLICATIONS

Jim Delahunt, "Gaiji: Characters, Glyphs, Both, or Neither?", 22nd International Unicode Conference, XP-002300971, Sep. 9, 2002, pp. 1-30.

* cited by examiner

*Primary Examiner* — Ali Bayat
(74) *Attorney, Agent, or Firm* — Oblon, Spivak, McClelland, Maier & Neustadt, L.L.P.

(57) ABSTRACT

An information processing apparatus for processing image data including character information, the processing of image data including a process of inserting interpretation information corresponding to the character information. The information processing apparatus includes an image data acquisition unit, an interpretation information retrieval unit, an area information definition unit, and an insertion style determination unit. The image data acquisition unit acquires the image data including the character information composed of a plurality of characters having a first string of characters. The interpretation information retrieval unit retrieves first interpretation information to be attached to the first string of characters. The area information definition unit computes insertable area information on a first insertable area, usable for inserting the first interpretation information, based on coordinate data of characters in the acquired image data. The insertion style determination unit determines an insertion style of the first interpretation information based on the insertable area information.

17 Claims, 11 Drawing Sheets

| LINE-CHARACTER INFORMATION | COORDINATE DATA | |
|---|---|---|
| 文字認識技術は… | $X_1,Y_1 - X_2,Y_2$ | |
| です。オフィス業務の… | $X_3,Y_3 - X_4,Y_4$ | |
| でも紙が使用される… | $X_5,Y_5 - X_6,Y_6$ | … |
| する期待は小さくなる… | $X_7,Y_7 - X_8,Y_8$ | |
| | ⋮ | | original document establishing your age, identify and U.S. citizenship or lawful alien status, such as a birth certificate and a driver's license;

| WORD CHARACTER INFORMATION | COORDINATE DATA |
|---|---|
| original | $X_1,Y_1 - X_2,Y_2$ |
| document | $X_3,Y_3 - X_4,Y_4$ |
| establishing | $X_5,Y_5 - X_6,Y_6$ |
| your | $X_7,Y_7 - X_8,Y_8$ |
| ⋮ | |

FIG. 14
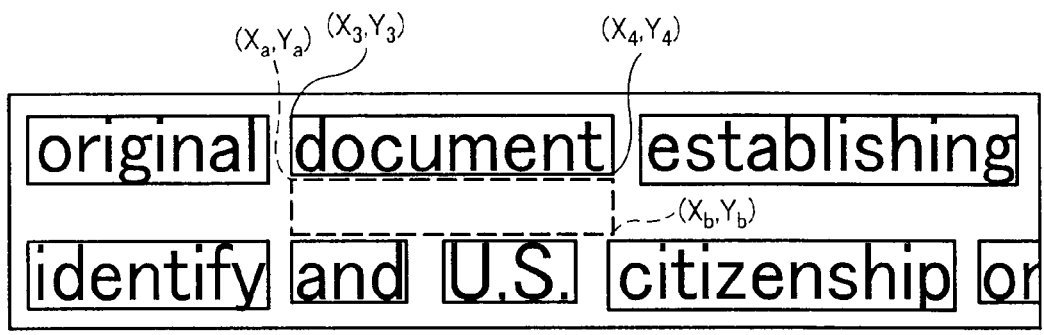
FIG. 15
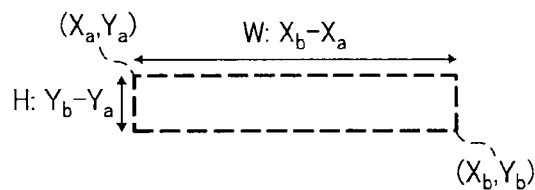
FIG. 16
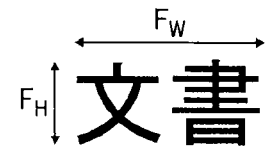
FIG. 17
| INSERTING INFORMATION | INSERTABLE AREA | INSERTION STYLE | |
|---|---|---|---|
| 独創的な | $X_c,Y_c - X_d,Y_d$ | DIRECT/FONT SIZE : 10.5 | |
| 文書 | $X_a,Y_a - X_b,Y_b$ | DIRECT/FONT SIZE : 10.5 | |
| 確立する | $X_e,Y_e - X_f,Y_f$ | DIRECT/FONT SIZE : 10.5 | ... |
| 同一であること | $X_g,Y_g - X_h,Y_h$ | FOOTNOTE/SIGN : *1 | |
| | : | | |

FIG. 18 original document establishing
　　　　　　文書
identify and U.S. citizenship or

FIG. 19 original document establishing
　　　　　*1
identify and U.S. citizenship or

$(X_a, Y_a)$　　　$(X_b, Y_b)$ original document establishing
identify and U.S. citizenship or

FIG. 21

$(X_a, Y_a)$　　　$(X_b, Y_b)$ original document establishing
identify and U.S. citizenship or

FIG. 22 original document establishing
*1      文書、書類、ドキュメント、記録…   *2
identify and U.S. citizenship or

*1 : 独創的な、原型の、原作、独創的な人…
*2 : 確立する、安定させる、…

FIG. 23 original document establishing
identify and U.S. citizenship or original : 独創的な、原型の、原作、独創的な人…
document : 文書、書類、ドキュメント、記録、…
establishing : 確立する、安定させる、…

FIG. 24

| WORD | CLASS | MEANING | |
|---|---|---|---|
| ⋮ | | | |
| original | a | 原子[原初]の | |
| | a | 独創的な | |
| | n | 原作 | ... |
| | n | 独創的な人 | |
| ⋮ | | | |

FIG. 25 original document establishing
原子［原初］の、独創的な
原作、独創的な人
identify and U.S. citizenship or

FIG. 26 original document establishing
原子［原初］の、独創的な
identify and U.S. citizenship or

FIG. 27 original document establishing
┌─────────┐┌─────────────────┐
│原子［原初］の│└─────────────────┘
└─────────┘
identify and U.S. citizenship or

FIG. 28 original document establishing
┌────┐┌─────────────────────┐
│原作 ││                     │
└────┘└─────────────────────┘
identify and U.S. citizenship or

INFORMATION PROCESSING APPARATUS, METHOD OF PROCESSING INFORMATION, CONTROL PROGRAM, AND RECORDING MEDIUM

CROSS-REFERENCE TO RELATED APPLICATIONS

This application claims priority to Japanese Patent Application No. 2008-146115, filed on Jun. 3, 2008 in the Japan Patent Office, the entire contents of which are hereby incorporated by reference herein.

BACKGROUND OF THE INVENTION

1. Field of the Invention

The present invention relates to an information processing apparatus, a method of processing information, a control program, and a recording medium, and more particularly, to a method of processing information when outputting the information by inserting information corresponding to character information included in the outputting information.

2. Description of the Background Art

With the diffusion of information communication technology using electronicized data, image forming apparatuses and image processing apparatuses such as printers and facsimile machines have become indispensable to process electronicized data more efficiently. Many of these image processing apparatuses are designed as multi-functional image processing apparatuses, equipped with an image scanning function, an image forming function, a communication function, or the like, and are used as printers, facsimile machines, scanners, copiers, and so forth.

Such multi-functional image processing apparatuses may be used to output image data in which translations are added to terms in the document. For example, JP-H05-266075-A discloses a method of adding translation terms between lines of text. Specifically, when one line includes a word that requires translation, a space between that line and the next line is expanded, by which the translation term can be added between lines of text. Further, space for adding translations can be secured by deleting non-text information in the document, such as tables and figures.

However, the method described in JP-H05-266075-A may change the original layout of a source document, or may delete information included in the source document when the document is copied. For example, if the space between adjacent lines in the image data is expanded, inevitably the number of lines that can be included in one page is reduced. As a result, the layout of each page, which constitutes the document, changes, increasing the total number of pages of the copied image compared to the total number of pages of the source document. Further, if table and figure information included in the source document is deleted, it can become difficult or impossible to understand the content of the document.

Such layout breakdown may be solved, for example, by using footnotes, that is, inserting a translation term in the source document at the bottom of each page. When the footnote style is used, a number or symbol is inserted near the footnoted word, and a translation term for that word may displayed elsewhere while correlating the number or symbol with the translation term. The footnote may be an explanatory note separately added to the main text of document. For example, in the case of a book, a footnote may be added below the main text of each page.

Inserting a translation term near a word to be translated (termed "direct insertion") as much as possible can enhance the readability of the document. However, if not enough space can be secured near the word to be translated for inserting a translation term, the translation term may be displayed with a too-small font size. To avoid this, the footnote style of inserting the symbol near the word to be translated may be used instead of direct insertion. However, a user must determine whether to use direct insertion or footnotes, which may inconvenience the user.

Such inconvenience due to having to select either direct insertion or footnotes may occur in several cases: when a source document written in one language is given a translation of terms into another language when the source document is copied, for example, or when an explanatory note to explain difficult technical jargon or specially defined terms is added to the main text when copying the source document. Such translations or explanatory notes may be, but are not limited to, dictionary information, which correlates words and their meanings, and technical term information, which correlates technical jargon and its often abstruse meanings.

Such need to choose between either direct insertion or footnotes may cause inconvenience the user when it comes to inserting given information for given character information included in input data information (e.g., a source document).

SUMMARY

In one aspect of the present invention, an information processing apparatus for processing image data including character information, the processing of image data including a process of inserting interpretation information corresponding to the character information in the image data. The information processing apparatus includes an image data acquisition unit, an interpretation information retrieval unit, an area information definition unit, and an insertion style determination unit. The image data acquisition unit acquires the image data including the character information composed of a plurality of characters having a first string of characters. The interpretation information retrieval unit retrieves first interpretation information to be attached to the first string of characters. The area information definition unit computes insertable area information on a first insertable area usable for inserting the first interpretation information. The first insertable area is defined based on coordinate data of characters in the acquired image data. The insertion style determination unit determines an insertion style of the first interpretation information based on the insertable area information. The insertion style includes conditions for inserting the first interpretation information.

In another aspect of the present invention, a method of processing image data including character information is devised. The processing of image data includes a process of inserting interpretation information corresponding to the character information in the image data. The method includes the steps of acquiring, retrieving, computing, and determining. The acquiring step acquires the image data including the character information composed of a plurality of characters having a first string of characters. The retrieving step retrieves first interpretation information to be attached to the first string of characters. The computing step computes insertable area information on a first insertable area usable for inserting the first interpretation information. The first insertable area is defined by coordinate data of characters in the acquired image data. The determining step determines an insertion style of the first interpretation information based on the insertable area information. The insertion style includes conditions for inserting the first interpretation information.

In another aspect of the present invention, a computer-readable medium storing a program of processing image data including character information, comprising computer readable instructions, that when executed by a computer, that instructs a controller to carry out a method of processing of image data including a process of inserting interpretation information corresponding to the character information in the image data. The method includes the steps of acquiring, retrieving, computing, and determining. The acquiring step acquires the image data including the character information composed of a plurality of characters having a first string of characters. The retrieving step retrieves first interpretation information to be attached to the first string of characters. The computing step computes insertable area information on a first insertable area usable for inserting the first interpretation information. The first insertable area is defined by coordinate data of characters in the acquired image data. The determining step determines an insertion style of the first interpretation information based on the insertable area information. The insertion style includes conditions for inserting the first interpretation information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 shows an example of input information input to an image processing apparatus, in which a Japanese sentence is used as input information;

FIG. 6 shows an example of input information according to an exemplary embodiment, in which a peripheral boundary of each of characters are elicited;

FIG. 7 shows an example of input information according to an exemplary embodiment, in which a peripheral boundary of one line including a plurality of characters are elicited;

FIG. 14 shows an example process of eliciting an insertable area for the input information of FIG. 10;

FIG. 15 shows an example process of computing an insertable area for a given characters included in input information;

FIG. 16 shows an example of interpretation information having a given dimension;

FIG. 17 shows an example of character display area information including insertion style information for the input information of FIG. 10;

FIG. 18 shows an example insertion style of interpretation information according to an exemplary embodiment;

FIG. 19 shows another example insertion style of interpretation information according to another exemplary embodiment;

FIG. 20 shows another example process of eliciting an insertable area;

FIG. 21 shows another example process of eliciting an insertable area;

FIG. 22 shows another example insertion style of interpretation information in an insertable area according to another exemplary embodiment;

FIG. 23 shows another example insertion style of interpretation information in an insertable area according to another exemplary embodiment;

FIG. 24 shows example case that a plurality of meanings is stored in interpretation information database for one word;

FIG. 25 shows another example insertion style of interpretation information in an insertable area according to another exemplary embodiment, in which information of FIG. 24 is used;

FIG. 26 shows another example insertion style of interpretation information in an insertable area according to another exemplary embodiment, in which information of FIG. 24 is used;

FIG. 27 shows another example insertion style of interpretation information in an insertable area according to another exemplary embodiment, in which information of FIG. 24 is used; and FIG. 28 shows another example insertion style of interpretation information in an insertable area according to another exemplary embodiment, in which information of FIG. 24 is used.

Figure 1:
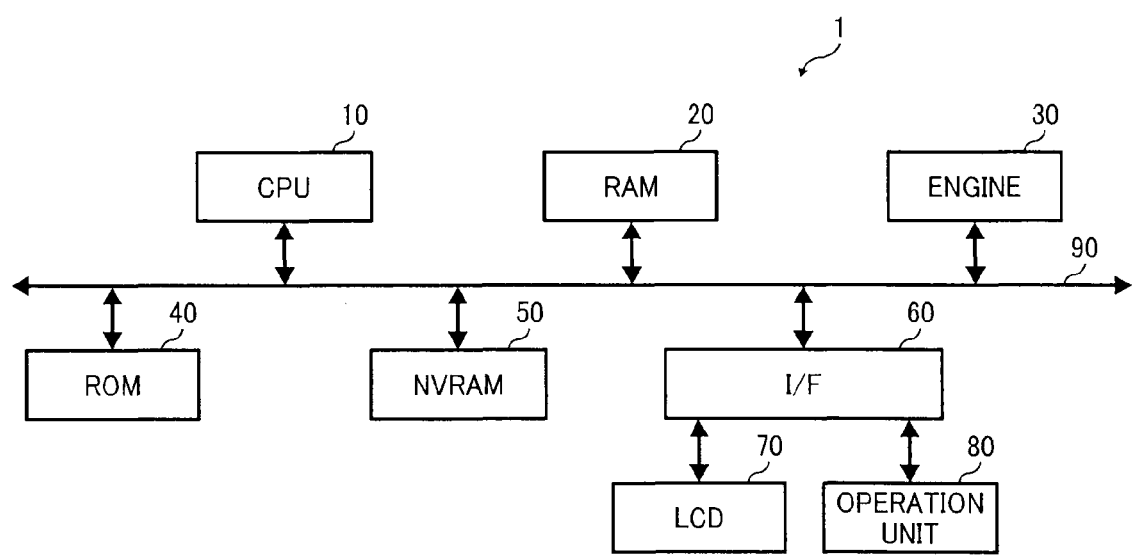
FIG. 1 shows a block diagram of hardware configuration for an image processing apparatus according to an exemplary embodiment.

The accompanying drawings are intended to depict example embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXAMPLE EMBODIMENTS

A description is now given of example embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing expanded views shown in the drawings, specific terminology is employed for the sake of clarity, the present disclosure is not limited to the specific terminology so selected and it is to be understood that each specific element includes all technical equivalents that operate in a similar manner.

Referring now to the drawings, an information processing apparatus according to an example embodiment is described. The information processing apparatus may be an image processing apparatus or an image forming apparatus, for example. Hereinafter, the image processing apparatus may be exemplary used for following description. The image processing apparatus may be a multi-functional image processing apparatus, which includes a plurality of functions such as for example scanning function, printing function, and copying function, for example, but not limited thereto.

The image processing apparatus may conduct an image displaying operation such as for example displaying an image on a screen, printing an image on a medium, or copying an image on a medium, for example. When such image displaying operation is conducted, input information (or data) is analyzed, and then an image is output on a medium (e.g., sheet, screen) by inserting interpretation information with the output image. Such interpretation information may be a translation term for a target word, and an explanatory note adding or giving an explanation to a target word, but not limited these. In this specification, the term of "word" may mean at least one word, or one character having a given meaning of any languages, but not limited thereto. For example, the term of "word" may mean a phrase composed of a plurality of words. Further, input information (or data) may be written in any language such as for example English, Japanese, but not limited thereto. Such image processing apparatus may be used to analyze input information (or data) and insert interpretation information in the input information (or data) when the input information (or data) is to be output on a given medium (e.g., sheet, screen).

FIG. 1 shows a block diagram of an example hardware configuration of an image processing apparatus 1 according to an exemplary embodiment. As shown in FIG. 1, the image processing apparatus 1 may have a configuration similar to an information processing terminal (e.g., server, personal computer PC). The image processing apparatus 1 may include a central processsing unit 10 (CPU 10), a random access memory 20 (RAM 20), an engine 30, a read only memory 40 (ROM 40), a non-volatile random access memory 50 (NVRAM 50), an interface 60 (I/F 60), and a bus 90 to connect such units, for example. The image processing apparatus 1 may further include a liquid crystal display 70 (LCD 70) and an operation unit 80 connected to the I/F 60.

The CPU 10, used as a computing unit, controls operations for the image processing apparatus 1 as a whole. The RAM 20 may be a volatile memory medium used for high-speed data reading/writing, and also used as a working memory area when the CPU 10 processes data or information. The engine 30 may be an image processing engine, which conduct a scanning process, a printing process or the like for image data. The ROM 40 may be a read-only non-volatile memory medium, and store a program (e.g., firmware).

The NVRAM 50 may be a non-volatile memory medium used for data reading/writing, and store an operation system (OS), a plurality of control programs, application programs and operation parameters for the application program. The I/F 60 is connected to a plurality of hardware units via the bus 90 and a network, and control data flow for the image processing apparatus. The LCD 70 may be used as a user interface to show graphical or visual information to indicate an operation status of the image processing apparatus 1. A user can recognize the operation status of the image processing apparatus 1 by viewing the LCD 70. The operation unit 80 may be used as another user interface, which is used by a user to input information or data to the image processing apparatus 1. The operation unit 80 may be keyboard, a mouse, or the like, but not limited thereto.

In such hardware configuration, a program stored in a memory medium (e.g., ROM 40, NVRAM 50, hard disk drive (HDD), optical disk) is read to the RAM 20, and the CPU 10 conducts a given operation using the program read to the RAM 20. With such collaboration of such software and hardware units having given functions, the image processing apparatus 1 can conduct a given operation.

Figure 2:
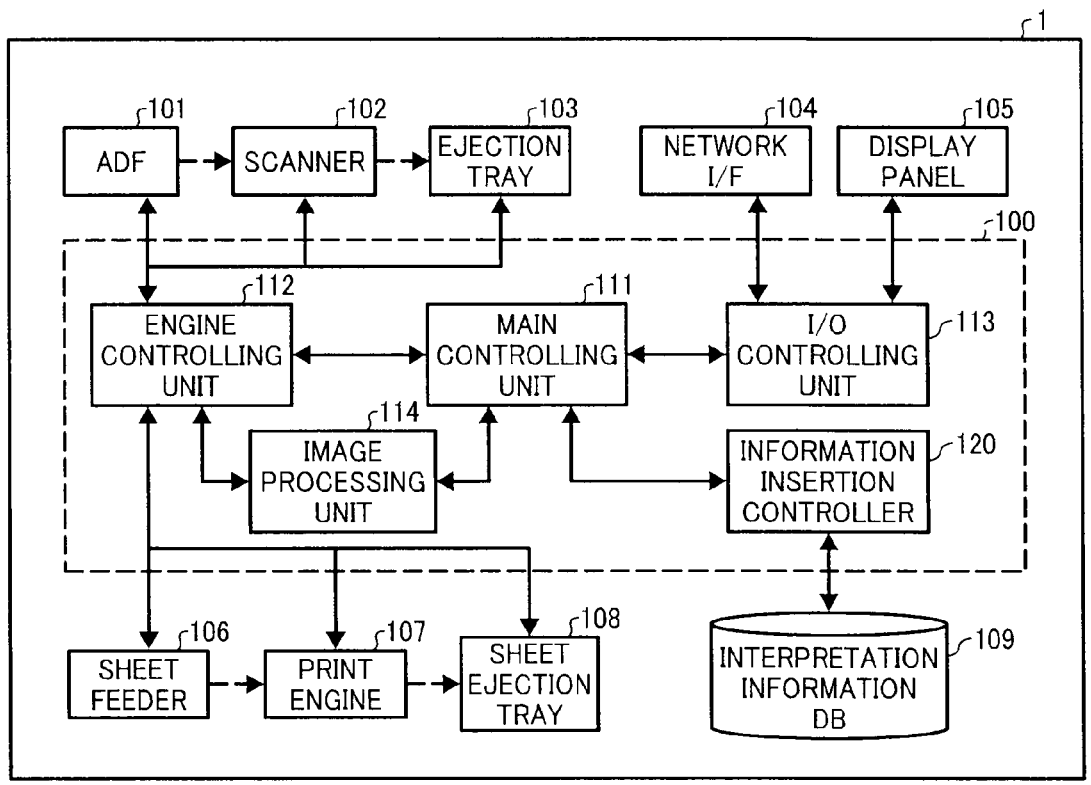
FIG. 2 shows a block diagram of functional units disposed in an image processing apparatus according to an exemplary embodiment.

FIG. 2 shows an example block diagram of the image processing apparatus 1. The image processing apparatus 1 may include a controller 100, an automatic document feeder 101 (ADF 101), a scanner 102, an ejection tray 103, a network I/F 104, a display panel 105, a sheet feeder 106, a print engine 107, a sheet ejection tray 108, and an interpretation information database (DB) 109, for example.

The controller 100 may include a main controlling unit 111, an engine controlling unit 112, an input/output (I/O) controlling unit 113, an image processing unit 114, and an information insertion controller 120, for example. In FIG. 2, electric signals can be transmitted among the units along an arrow shown by solid line, and a sheet (used as recording medium) can be transported among the units along an arrow shown by a dashed line. The controller 100 may be operated when the CPU 10 is activated using a program loaded in the RAM 20 (see FIG. 1).

The network I/F 104 is an interface, which is used to communicate information between the image processing apparatus 1 and a client terminal, for example. The network I/F 104 may use the I/F 60 shown in FIG. 1. For example, when the client terminal transmit a print job command to the image processing apparatus 1 via the network I/F 104, the controller 100 receives such print job command. Then, the controller 100 conducts a given image forming operation based on the print job command.

The display panel 105 may be a flat panel or the like used as an output interface to show graphical or visual information, by which a user can recognize an operation status of the image processing apparatus 1. The display panel 105 may also be used as an input interface (e.g., touch panel) to input information or data to the image processing apparatus 1. A user may operate the display panel 105 to input information or data to the image processing apparatus 1. The display panel 105 may be shown as the LCD 70 and the operation unit 80 in FIG. 1.

The interpretation information DB 109 may store information or data such as for example "dictionary information," which correlates words and meanings, "technical term information," which correlates technical jargons and meanings, which may be difficult-to-understand, but not limited thereto. The interpretation information DB 109 may be the NVRAM 50 (see FIG. 1), a hard disk drive (HDD), or the like, which is a non-volatile memory medium that can store information or data.

The main controlling unit 111 may control the above-mentioned units provided in the controller 100 by transmitting given commands. The engine controlling unit 112 is used as a control unit and a drive unit to control and drive the print engine 107, the scanner 102, or the like. The I/O controlling unit 113 is used to receive information (e.g., print job command) from the network I/F 104 and then transmit the information to the main controlling unit 111. Further, the I/O controlling unit 113 transmits information to an apparatus connected to a network via the network I/F 104 when the main controlling unit 111 instructs an output command to the I/O controlling unit 113.

Under a control of the main controlling unit 111, the image processing unit 114 generates imaging information based on information included in a print job command, wherein such imaging information includes information to be used for forming an image by using the print engine 107. Further, the image processing unit 114 processes scanned image data scanned by the scanner 102, and generates image data to be used for image forming. The image data can be stored in HDD or transmitted to a client terminal via the network I/F 104.

Under a control command of the main controlling unit 111, the information insertion controller 120 analyzes the input information or data and inserts given types of information into image data to be output (e.g., print, display) on a given medium. The information insertion controller 120 refers to the interpretation information DB 109 to analyze and insert given types of information. As such, the information insertion controller 120 according to an exemplary embodiment may conduct such information insertion function.

When the image processing apparatus 1 is used as a printer, the I/O controlling unit 113 may receive a print job command from a universal serial bus (USB) or a local area network (LAN) connected to the network I/F 104, for example. When the print job command is generated as such, the main controlling unit 111 inputs image information or data included in the print job command to the information insertion controller 120. Under a control of the main controlling unit 111, the information insertion controller 120 inserts given types of information (e.g., translation term, explanatory note) in an image data to be output, and such generated image data including the inserted information can be output. Such insertion process conducted by the information insertion controller 120 will be described later in detail.

After inserting information, the information insertion controller 120 transmits the generated image data including the inserted information to the main controlling unit 111. Then, the image processing unit 114 generates imaging information based on the image data including the inserted information generated by the information insertion controller 120 under a command of the main controlling unit 111. The imaging information generated by the image processing unit 114 may be sequentially transmitted to and stored in the HDD temporarily.

Under a control of the main controlling unit 111, the engine controlling unit 112 drives the sheet feeder 106 to transport a recording sheet to the print engine 107. Further, the engine controlling unit 112 retrieves the imaging information from the HDD, and inputs the imaging information to the print engine 107. After receiving the imaging information from the engine controlling unit 112, the print engine 107 conducts an image forming operation on the recording sheet transported from the sheet feeder 106. Accordingly, the print engine 107 may function as an image forming unit. Specifically, the print engine 107 may be an image forming system using for an inkjet method, electrophotography, or the like, but not limited thereto. After conducting an image forming operation by the print engine 107, the recording sheet is ejected to the sheet ejection tray 108.

In such image processing apparatus 1, the information insertion controller 120 can insert given types of information such as for example translation term and explanatory note in a to-be-output image as above described. A description is now given to the information insertion controller 120 with reference to FIG. 3.

Figure 3:
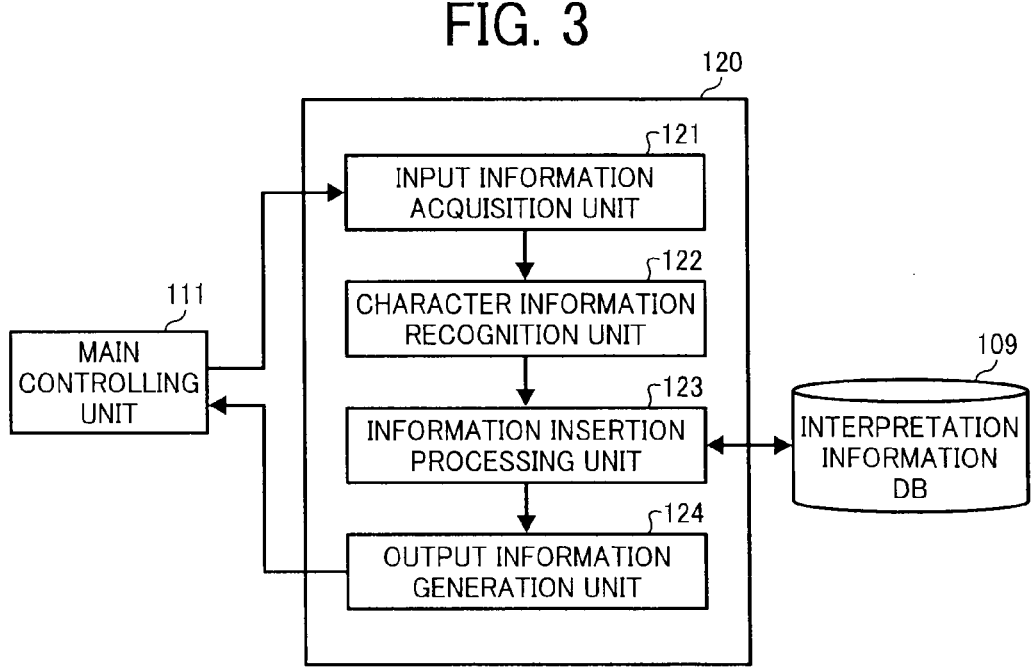
FIG. 3 shows a block diagram of an information insertion controller according to an exemplary embodiment.

FIG. 3 shows a block diagram of the information insertion controller 120 connected to the main controlling unit 111 and the interpretation information DB 109. As shown in FIG. 3, the information insertion controller 120 may include an input information acquisition unit 121, a character information recognition unit 122, an information insertion processing unit 123, and an output information generation unit 124, for example. The information insertion controller 120 may be controlled by the CPU 10 using a given program loaded on the RAM 20 (see FIG. 1).

The input information acquisition unit 121 receives input information or data (hereinafter, input information) which is to be used for outputting a given image, which may be added and inserted with given types of information such as for example a translation term, an explanatory note, or the like. The input information may be input to the image processing apparatus 1 when the scanner 102 scans a document and generates image information or data, or when a print job command including image information or data is input to the image processing apparatus 1 via the network I/F 104. The input information acquisition unit 121 may receive the input information from the main controlling unit 111. Then, the input information acquisition unit 121 transmits the input information to the character information recognition unit 122. As such, the input information acquisition unit 121 may be used to obtain input information.

The character information recognition unit 122 recognizes character information included in the input information, which is received by the input information acquisition unit 121. The character information may include alphabet, letter, numbers, sign, and characters used in any languages, for example. Specifically, the character information recognition unit 122 may recognize characters included in image information or data input by a print job command as graphical image using an optical character recognition (OCR), and then the graphical image of characters may be recognized as character code information, which can be recognized as text information.

Figure 4:
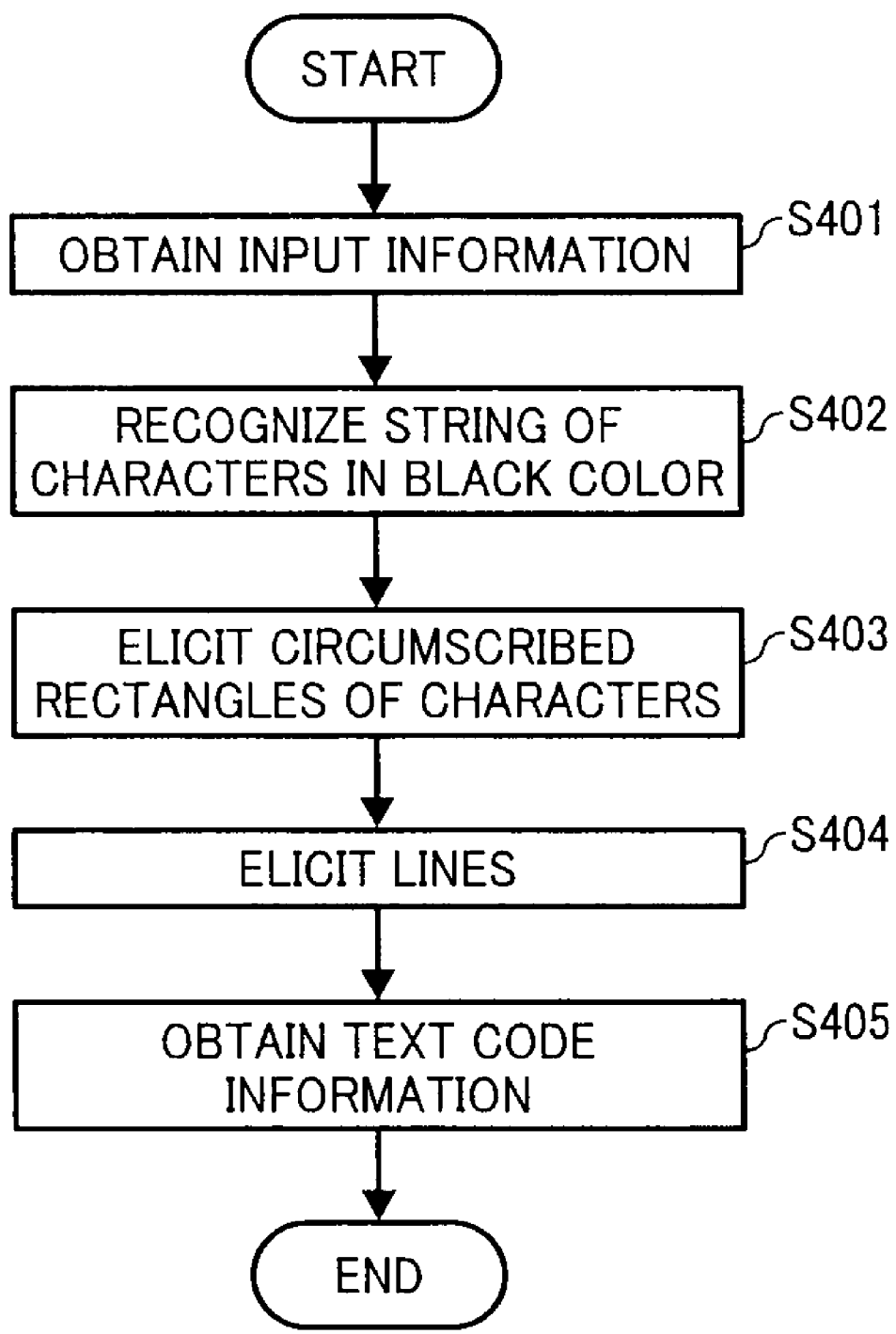
FIG. 4 is a flowchart showing a process of recognizing character information using a character information recognition unit.

A description is now given to the character information recognition unit 122, which conducts a character recognition operation with reference to FIGS. 4, 5, 6, and 7. FIG. 4 is a flowchart showing a process of recognizing character by using the character information recognition unit 122.

At step S401, the character information recognition unit 122 acquires or obtains the input information (e.g., image data) from the input information acquisition unit 121. For example, a source image 500 shown in FIG. 5 may be used as the input information. In FIG. 5, the input information is image information or data that includes sentence displayed on white background, in which the sentence is composed of Japanese characters, and a string of black letters are displayed on a white background, for example.

When the source image 500 (see FIG. 5) is acquired as the input information, the character information recognition unit 122 may recognize the input information as a string of characters (e.g., black color characters) at step S402.

At step S403, the character information recognition unit 122 elicits a circumscribed rectangle for each of recognized characters (e.g., black color characters) as shown in FIG. 6. FIG. 6 shows one example for an eliciting process of the recognized characters (e.g., black color characters) conducted by the character information recognition unit 122. When circumscribed rectangles are elicited as shown in FIG. 6, the character information recognition unit 122 may link adjacent retangles, and extends the circumscribed rectangles in one direction for a given length to elicit one line at step S404 as shown in FIG. 7. FIG. 7 shows one example for a line prepared in such eliciting process, which is conducted by the character information recognition unit 122.

In step S404, adjacent retangles can be linked into a horizontal direction or a vertical direction to conduct a line eliciting process. If the input information includes sentences readable in a vertical direction, the character information recognition unit 122 links adjacent retangles in the vertical direction. On one hand, if the input information includes sentences readable in a horizontal direction, the character information recognition unit 122 links adjacent retangles in the horizontal direction. As shown in FIG. 7, the input information includes sentences readable in the horizontal direction. Accordingly, the character information recognition unit 122 links the adjacent retangles in the horizontal direction, and then elicits lines one by one in the horizontal direction.

In case of the source image 500 (see FIG. 5), line images 501 to 504 are elicited by conducting step S404 as shown in FIG. 7. Further, the character information recognition unit 122 can elicit document word by word if the document is written in English sentence composed of words, wherein such word-by-word eliciting will be described later.

After such line eliciting process (see FIG. 7), the character information recognition unit 122 conducts a character recognition process for each of elicited line images at step S405. The character information recognition unit 122 conducts the character recognition process to the characters in the elicited line images. Specifically, the characters in the elicited line images may be graphical characters, which is only recognized as just image, such as for example picture image. By examining character features and using a pattern-matching dictionary, encoded text data matched to graphic character image can be obtained. As such, in such step S405, image data can be recognized as text code. Such character recognition operation can be conducted by a known method.

Figures 8, 9, 10:
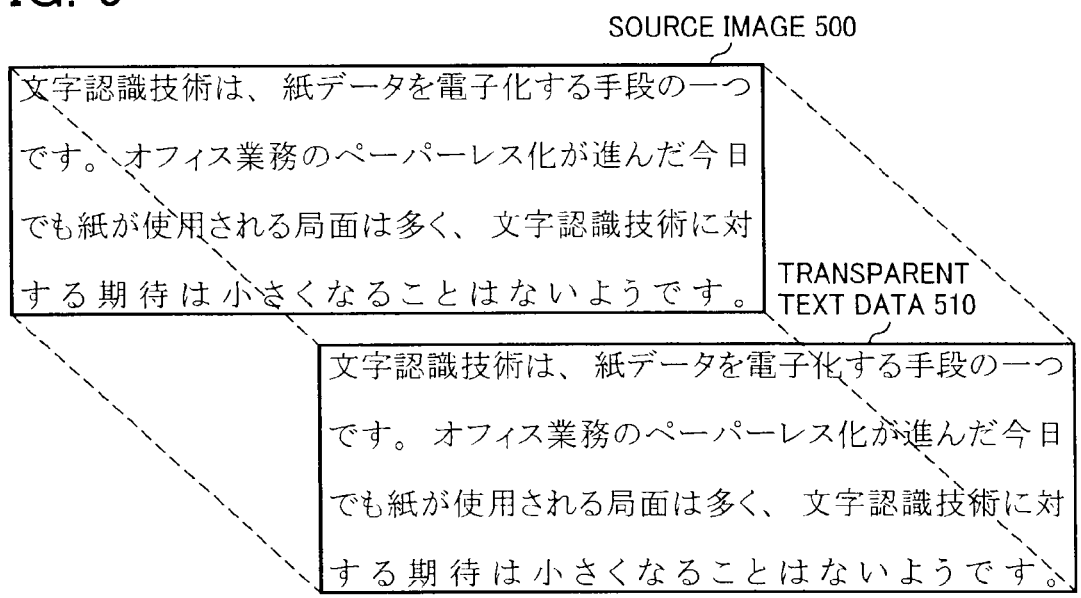
FIG. 8 shows an example of character display area information for input information of FIG. 5.
FIG. 9 shows an example of to-be-output data.
FIG. 10 shows an example of input information, in which an English sentence is used as input information.

When the character recognition operation shown in FIG. 4 is conducted and the text code information is obtained, the character information recognition unit 122 may generate a character display area information, in which recognized character information and a display area of the recognized character information is correlated each other for the input information (e.g., input image information). FIG. 8 shows an example character display area information generated for the character recognition operation of FIG. 4. As shown in FIG. 8, the character display area information may include character information for each line elicited at S404 (hereinafter, line-character information) and coordinate data corresponding to a display area of each line-character information. If the input information is English sentence, the character information recognition unit 122 may elicit the input information word-by-word, and thereby word-character information may be generated at step S405 instead of line-character information, and such a case will be explained later.

When the character display area information (see FIG. 8) is generated, the character information recognition unit 122 generates a transparent text data 510 as shown in FIG. 9. The transparent text data 510 corresponds to the character image data included in the source image 500 (i.e., input information), and is prepared as invisible data for human eyes. As shown in FIG. 9, the character information recognition unit 122 overlaps the transparent text data 510 over the source image 500. As such, the source image 500, which is image information (or data), is overlayed with the transparent text data 510, and then such combined data having the source image 500 (image data itself) and the transparent text data 510 (text data having text code) may be used as image data to be output. As shown in in FIG. 9, transparent text data is prepared for each of line-character information.

By overlapping the transparent text data 510 over the source image 500 as shown in FIG. 9, character information displayed as graphic image can be searched using text data. Such two-way data style may be useful when a source data is stored in portable document format (or PDF). The character information recognition unit 122 inputs an output information shown in FIG. 9 to the information insertion processing unit 123. Accordingly, the information insertion processing unit 123 may function as an image data acquisition unit, which obtains image data.

The information insertion processing unit 123 inserts given types of information (e.g., translation term, explanatory note) to an to-be-output data obtained from the character information recognition unit 122 and referring the interpretation information DB 109. The given types of information may include information corresponding to character information included in the to-be-output data. For example, a translation term, an explanatory note or the like may be inserted. Such inserting information may be termed as interpretation information, hereinafter. The interpretation information may include translation term, explanatory note, comment, or the like, which may explain given information specifically.

Further, the information insertion processing unit 123 generates insertion style information, and inputs the insertion style information to the output information generation unit 124. The insertion style information includes specific information how to insert interpretation information (e.g., translation term, explanatory note) in the to-be-output data. Such a process conducted by the information insertion processing unit 123 will be explained later.

Based on the insertion style information obtained from the information insertion processing unit 123, the output information generation unit 124 generates an output information to be output by inserting given interpretation information (e.g., translation term, explanatory note) in the to-be-output data. As above described, the information insertion controller 120 may conduct a process of inserting information according to an exemplary embodiment.

Figure 11:
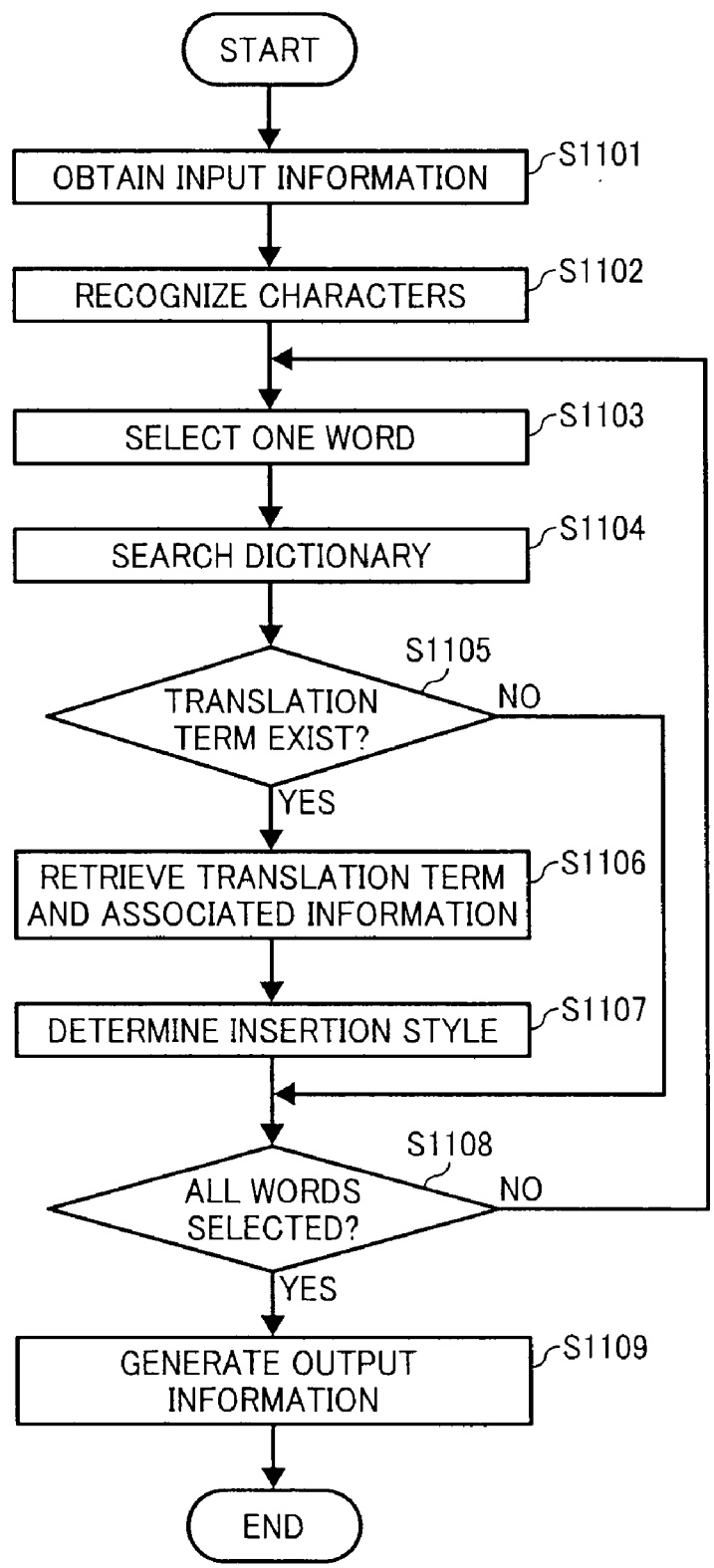
FIG. 11 is a flowchart showing a process of inserting information in a document using an information insertion controller.

A description is now given to a process of inserting interpretation information conducted by the information insertion controller 120 with reference to FIGS. 10 and 11. FIG. 10 shows input image information to be input to the image processing apparatus 1, in which the input image information may be a document written in English (hereinafter, English document). Specifically, when the English document is input and displayed as an image, a translation term in foreign language (e.g., Japanese term) may be inserted in the English document. FIG. 11 is flowchart showing an insertion process conductible by the information insertion controller 120.

At step S1101, the input information acquisition unit 121 receives and obtains the input information (see FIG. 10) by using the ADF 101, for example. The input information acquisition unit 121 inputs the input information to the character information recognition unit 122.

At step S1102, after receiving the input information from the input information acquisition unit 121, the character information recognition unit 122 conducts a character recognition operation using the process flow shown in FIG. 4. In case of FIG. 4, Japanese document (see FIG. 5) is used as the input information, and as shown in FIG. 8, the character display area information includes coordinate data to indicate a display area for each one of line images. On one hand, in case of FIG. 10, the English document is used as the input information, and an area corresponding to "one word" can be elicited, and coordinate data for such "one word" can be defined. Such word-by-word eliciting can be easily conducted because adjacently existing words are separated each other by setting a given space therebetween.

Accordingly, the character information recognition unit 122 can generate word display area information shown in FIG. 12, wherein the word display area information includes word character information (hereinafter, word-character information) correlated with coordinate data for an area that the concerned word is displayed. The character information recognition unit 122 inputs the word display area information and to-be-output data (see FIG. 10) to the information insertion processing unit 123.

After receiving the word display area information and to-be-output data (see FIG. 10) from the character information recognition unit 122, at step S1103, the information insertion processing unit 123 may select at least one word included in the word display area information. Accordingly, the information insertion processing unit 123 obtains the word that should be added with given interpretation information (e.g., translation term) from a plurality of words included in the character display area information at step S1103. Accordingly, the information insertion processing unit 123 may function as a character information acquisition unit.

At step S1104, the information insertion processing unit 123 refers to the interpretation information DB 109, and conducts a dictionary searching for the selected word. After the dictionary searching, it is judged whether a translation term (used as interpretation information) corresponding to the word selected at step S1103 exists in the interpretation information DB 109 at step S1105.

If the corresponding translation term exists (step S1105: YES), the information insertion processing unit 123 retrieves the translation term (used as interpretation information) from the interpretation information DB 109 at step S1106. Accordingly, the information insertion processing unit 123 may function as interpretation information retrieval unit, which can obtain or retrieve given interpretation information for concerned character information.

After retrieving the interpretation information at step S1106, at step S1107, the information insertion processing unit 123 determines an insertion style for the interpretation information based on blank space information set between one line and adjacent line, wherein the one line includes the word (hereinafter, may be referred to as "target word") selected at step S1103.

Based on a result at step S1107, the information insertion processing unit 123 generates insertion style information which correlates the translation term, which needs to be inserted, and its insertion style. The insertion style information may include font size information of word to be inserted, the number of lines used for inserting the interpretation information, a display position of the interpretation information (e.g., near a target word, or footnote), or the like. A detail of step S1107 will be described later.

After step S1107, it is checked whether all words included in the to-be-output data are selected. If all words are already selected (step S1108: YES), the information insertion processing unit 123 inputs the generated insertion style information to the output information generation unit 124. Based on the insertion style information generated by the information insertion processing unit 123, at step S1109, the output information generation unit 124 generates an output data, which includes the to-be-output data and the interpretation information (e.g., translation term, explanatory note) inserted in the to-be-output data, and then the process ends.

After step S1107, if all words are not yet selected (step S1108: NO), the process goes back to step S1103.

Further, if dictionary searching (step S1104) is conducted and then no translation term is found in the interpretation information DB 109 (step S1105: NO), step S1106 and step S1107 are not conducted (i.e., step S1106 and step S1107 are skipped), and then step S1108 is conducted.

Figures 12, 13:
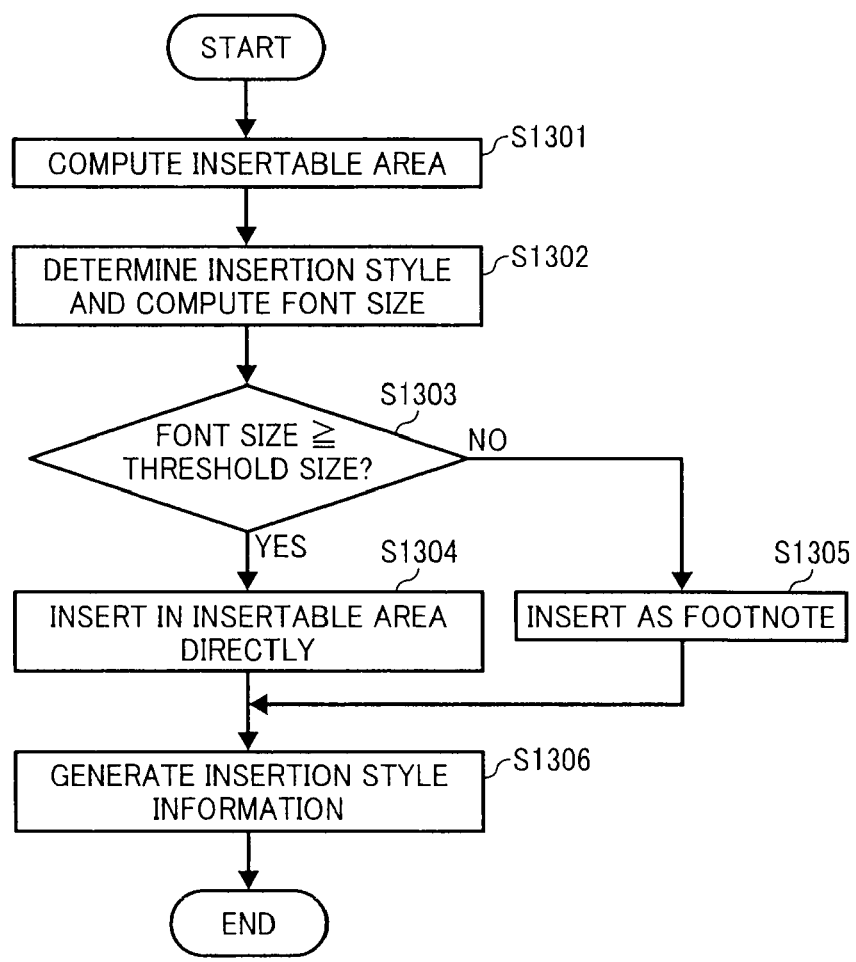
FIG. 12 shows an example of character display area information for input information of FIG. 10.
FIG. 13 is a flowchart showing a process of inserting information using an information insertion controller.

A description is now given to a detail process for step S1107 in FIG. 11 with reference to FIG. 13. At step S1106, the information insertion processing unit 123 retrieves a translation term, and then the information insertion processing unit 123 computes an area (hereinafter, "insertable area"), which can be used for inserting the translation term (used as interpretation information) at step S1301 for a target word. In such computing process, the information insertion processing unit 123 may computes area information used for inserting the translation term. Accordingly, the information insertion processing unit 123 may be used as an area information definition unit.

A description is now given to a process for computing an insertable area with reference to FIGS. 14 and 15. In an example case of FIG. 14, a word of "document" is set as a target word, and an insertable area for the "document" is computed. As shown in FIG. 14, the information insertion processing unit 123 may determine a blank space area between one line including a target word and an adjacent line as an insertable area (see dashed line in FIG. 14). More specifically, a given insertable area can be set for a given target word in such blank space area. For example, the information insertion processing unit 123 may set a given insertable area (see an rectangle area shown by a dashed line) for the target word of "document," and such insertable area is set to an adjacent area of the target word of "document."

As shown in FIG. 14, the information insertion processing unit 123 computes such insertable area defined by coordinates $(X_a, Y_a)$-$(X_b, Y_b)$ by referring to the word display area information shown in FIG. 12. The word display area information includes word character information and coordinate data indicating a position of word in one document. For example, the image of "document" is correlated to coordinate data of $(X_3, Y_3)$-$(X_4, Y_4)$.

In general, based on such coordinate data for each word, an area that characters exist in the source image can be defined. Then, based on such coordinate data of characters included in the input information, a specific string of letters consisting one word, converted to an encoded text data (i.e., transparent text data), can be defined in a given are with respect to the source image.

A translation term for the large word of "document" may be inserted in an insertable area having coordinates $(X_a, Y_a)$-$(X_b, Y_b)$ by following step. At first, the information insertion processing unit 123 refers to coordinate data of $(X_3, Y_3)$-$(X_4, Y_4)$ correlated to the word of "document" by referring to the word display area information (see FIG. 12). The information insertion processing unit 123 computes "$X_a$" and "$X_b$" using "$X_3$" and "$X_4$" respectively by referring the word display area information (see FIG. 12. Accordingly, the information insertion processing unit 123 may set an insertable area, which may match or correspond to a width of target word. Further, the information insertion processing unit 123 computes "$Y_a$" using "$Y_4$" by referring to the word display area information (see FIG. 12). Further, the information insertion processing unit 123 may compute "$Y_b$" using coordinates of upper end of words of "and" and "U.S." (see FIG. 14) adjacent to the word of "document" in a vertical direction. As shown FIG. 14, the words of "and" and "U.S." come below the word of "document." With such a process, coordinate information, which can define the insertable area (see dashed line in FIG. 14) for a given word, can be computed.

As shown in FIG. 14, the information insertion processing unit 123 may compute coordinates "$(X_a, Y_a)\text{-}(X_b, Y_b)$" to compute a width W and a height H which can be set for an insertable area, wherein a translation term or the like may be inserted in the insertable area. FIG. 15 shows a process of computing the width W and height H of the insertable area. The information insertion processing unit 123 uses such computed width "W" and height "H" to set the insertable area. With such process, the information insertion processing unit 123 can obtain information on a peripheral limit of the insertable area.

As such, the information insertion processing unit 123 computes the insertable area at step S1301.

At step S1302, the information insertion processing unit 123 determines an insertion style for the translation term, retrieved at step S1106 (see FIG. 11). At step S1302, the information insertion processing unit 123 adjusts an insertion style such as for example a font size, the number of lines to be displayed on a medium (e.g., sheet, screen) for the translation term so that the retrieved translation term can be fit within the insertable area computed at step S1301. FIG. 16 shows an example case for step S1302 conducted by the information insertion processing unit 123. In FIG. 16, a Japanese translation term for an English word of "document" is shown as a translation term. FIG. 16 shows Japanese term and written in Japanese character "文書" pronounced as "bunsho." Because Japanese uses several characters (e.g., kanji (or Chinese) characters, katakana, hiragana), which is different from English using only alphabets, Japanese translation terms may use such distinctive characters shown in FIG. 16.

At step S1302, the information insertion processing unit 123 checks a term-width "$F_W$" and a term-height "$F_H$" of translation term. As shown in FIG. 16, the translation term has the term-width "$F_W$" and term-height "$F_H$" required for displaying the translation term (i.e., interpretation information). The information insertion processing unit 123 determines a font size used for the translation term, which can be fit within the insertable area having the width "W" and height "H." The information insertion processing unit 123 determines to set a given font size for the translation term (i.e., interpretation information), which can be fit within the insertable area having the width "W" and height "H" while maintaining a relationship of $W \geq F_W$ and $H \geq F_H$.

Typically, the translation term (i.e., interpretation information) may be inserted using a space for one line, which is set between a line including a target word and adjacent line. However, the translation term may be inserted using a space prepared by combining a plurality of blank space lines depending on the number of letters or characters included in the translation term and the width "W" of the insertable area. For example, if the translation term is inserted in a space prepared by combining a plurality of blank space lines, such translation term can be displayed using a larger font size, which may be preferable for some cases.

As such, at step S1302, the information insertion processing unit 123 may set a given largest font size usable for displaying the translation term (i.e., interpretation information), in which the number of blank space lines that can be used for displaying the translation term may be considered.

Such process for determining a given largest font size may be conducted by a font size determination unit included in the information insertion processing unit 123.

At step S1302, the information insertion processing unit 123 computes a given largest font size usable for translation term (i.e., interpretation information).

At step S1303, the information insertion processing unit 123 compares the computed font size and a threshold size for font size set in advance. The threshold size is a font size for displaying a translation term in view of readability of letters or characters. Because human eyes cannot recognize too small-sized letters or characters, a font size of translation term may need to be larger than a given value of font size. Accordingly, a smallest font size that can be recognizable by human eyes may be set as the threshold size.

If the computed font size is equal to or greater than the threshold size (step S1303: YES), the information insertion processing unit 123 determines to insert the translation term into the insertable area, which is set near the target word at step S1304. In this specification, when a translation term is inserted into an insertable area, such insertion may be referred as "direct insertion." As such, based on a comparison of the computed font size and the threshold size, the information insertion processing unit 123 determines an insertion style of interpretation information. Accordingly, the information insertion processing unit 123 may be used as an insertion style determination unit.

If the computed font size is smaller than the threshold size (step S1303: NO), the information insertion processing unit 123 determines not to insert the translation term in the insertable area but to insert the translation term in another aream such as as footnote are at step S1305. Such footnote style may be used because a translation term displayed in too small font size may not be easily read by human eyes. The footnote may mean an area, which is provided at a bottom of main text, for example, but not limited thereto.

After step S1304 or step S1305, at step S1306, the information insertion processing unit 123 generates insertion style information based on the insertion style determined at step S1302 or the insertion style (e.g., footnote) determined at step S1305. Then, the process ends.

As above described, one given term may be added in the insertable area set near the target word, or may be added in another area such as for example footnote, in which the insertable area set near the target word may be referred as a "first insertable area" and footnote may be referred as "second insertable area" because when a process of adding one given term in an to-be-output data in the insertable area near the target word or in the footnote may be regarded as a process of inserting one given term in different areas.

In general, the interpretation information such as translation term or explanatory note may be preferably inserted to an area (e.g., insertable area) closer to the target word as much as possible. However, if the insertable area having the width W and H is too small and the translation term (i.e., interpretation information) having the term-width "$F_W$" and term-height "$F_H$" is fit in such too-small insertable area, a font size of the translation term becomes too small. As a result, the inserted translation term or explanatory note may become hard to read by human eyes. In view of such readability issue of information, the process shown in FIG. 13 may be preferably conducted to determine whether the interpretation information having a given font size can be displayed in the insertable area or displayed in another area such as footnote.

At step S1303, a threshold size for font size needs to be set in advance. The threshold size of font size may be set to a minimum font size which can be recognized by human eyes using a given standard. For example, American point used in Japanese Industrial Standards (JIS), PostScript Point, or the like may be used. Specifically, the threshold size for font size may be set to 10.5 point used as a standard for many document, or 8 point used for official gazette, but not limited these.

Further, the threshold size can be determined based on a font size of input image information (hereinafter, input font size). For example, in the character recognition process shown in FIG. 4, the input font size may be determined based on a font size used in the input image information. The input font size can be determined based on a height of line elicited at step S404 of FIG. 4. Then, the height of line (i.e., input font size) may be multiplied by a given percentage to obtain a threshold size for font size usable for a translation term. For example, the input font size may be multiplied by the percentage of 50%, 75%, or 80%. Further, the input font size may be multiplied by the percentage of 100% so that the threshold size becomes same as the input font size.

Further, in the process of FIG. 13, the interpretation information may be inserted into the insertable area (step S1304), or the interpretation information may be inserted as a footnote (step S1305). However, the interpretation information can be displayed at any area other than the insertable area and footnote. For example, the interpretation information may be displayed at an end of sentence, a header, a footer, a next page, or another page, but not limited thereto.

FIG. 17 shows one example of insertable information table prepared for the output information generated at step S1109 in FIG. 11. As shown in FIG. 17, the information insertion processing unit 123 generates the insertable information table at step S1109 in FIG. 11, wherein the insertable information table may include insertable information, insertable area, and insertion style information. The insertion style information may include information how to insert the interpretation information: in one case, the interpretation information is "directly" inserted in the insertable area; and in another case, the interpretation information is inserted as "footnote". Accordingly, if the interpretation information is to be "directly" inserted, the insertion style information may include a font size information for displaying the interpretation information. On one hand, if the interpretation information is inserted as a "footnote," the insertion style information may include reference sign information, which correlates a target word and footnote.

FIG. 18 shows an example case that the interpretation information is directly inserted into the insertable area, and FIG. 19 shows an example case that the interpretation information is inserted as a footnote. FIGS. 18 and 19 show example cases that a Japanese translation term of ""文書(pronounced "bunsho" in Japanese)" is inserted for the English word of "document". When the interpretation information is inserted as a footnote, the insertable area may display a reference character such as for example number, sign, or the like. FIG. 19 shows a case that the reference character "*1" is used to correlate the English word of "document" and the corresponding Japanese translation term. Specifically, the reference character "*1," is inserted in the insertable area provided adjacently to the "document," and the same reference character "*1" is displayed in a blank space located at different position, and the reference character "*1" is used to correlate the interpretation information (e.g., Japanese translation term) and the "document" as a footnot of "*1: 文書."

The display style shown in FIG. 19 may be useful to easily correlate the target word and the interpretation information even if the interpretation information cannot be directly displayed in the insertable area. When the output information generation unit 124 generates the output information inserted with the interpretation information (see FIGS. 18 and 19), the output information generation unit 124 transmits the output information to the main controlling unit 111. With the above-described process, the information insertion controller 120 completes a process of inserting information in a given document or the like.

Further, when inserting the interpretation information, the interpretation information may be preferably generated as another layer as similar to the transparent text data 510, which is overlayed on the to-be-output data as shown in FIG. 9. If the interpretation information is generated as another layer, the interpretation information, the input information 500, and the transparent text data 510 can be easily separated.

Further, the interpretation information can be added in the transparent text data 510 (hereinafter, added layer). If the interpretation information is added in the transparent text data 510, the interpretation information and the transparent text data 510 can be easily separated from the input information 500 as one added layer.

As above described, in the image processing apparatus 1, the information insertion controller 120 can preferably insert a translation term or the like without changing a format of the input information. In FIGS. 18 and 19, a translation term is inserted for a word included in the input document; in addition to such translation term, an explanatory note for technical jargons having difficult-to-understand meaning, or an explanatory note for a term specially defined by an author can be inserted, but not limited thereto.

Terms having difficult-to-understand meaning or specially defined terms and corresponding insertion style information may be stored in the interpretation information DB 109. Specifically, terms having difficult-to-understand meaning/terms specially defined by an author and corresponding explanatory note may be correlated and then stored in the interpretation information DB 109. The information insertion processing unit 123 may retrieve such correlated information for the terms having difficult-to-understand meaning/terms specially defined by an author at step S1104 for dictionary searching (see FIG. 11) from the interpretation information DB 109, and use such correlated information as interpretation information.

In the above described cases, the image processing apparatus 1 may be used as a printer, in which the information insertion controller 120 is used to insert a translation term or the like. However, the image processing apparatus 1 can be used as a scanner with a similar manner. When the image processing apparatus 1 is used as a scanner, the I/O controlling unit 113 receives a scan command. The scan command can be input when a user presses a start key on the display panel 105; or the scan command can be input from an external host apparatus via the network I/F 104. When the scan command is input, the I/O controlling unit 113 transmits a scan command signal to the main controlling unit 111. When the main controlling unit 111 receives the scan command signal from the I/O controlling unit 113, the main controlling unit 111 controls the engine controlling unit 112 using the scan command signal.

Then, the engine controlling unit 112 drives the ADF 101 to transport a to-be-scanned document, set on the ADF 101, to the scanner 102. Further, the engine controlling unit 112 drives the scanner 102 to scan a document transported from the ADF 101. Similarly, when a document is directly set on the scanner 102, the engine controlling unit 112 similarly controls the scanner 102 to scan the document set on the scanner 102. As such, the scanner 102 scans document image.

In such image scanning operation, the scanner 102 scans the document using a light beam and a scanning device (e.g., charge coupled device CCD), and generates a scanned image data based on optical information. The engine controlling unit 112 transfers the scanned image data generated by the scanner 102 to the image processing unit 114. Under a control of the main controlling unit 111, the image processing unit 114 generates image information or data based on the scanned image data received from the engine controlling unit 112.

The image information or data generated by the image processing unit 114 is input to the information insertion controller 120 by the main controlling unit 111. Accordingly, image information or data generated by the image processing unit 114 can be used as the input information. The information insertion controller 120 conducts an operation shown in FIGS. 11 and 13 for inserting information and generating an output information having a given output style. The output information generated by the information insertion controller 120 may be stored in a hard disk drive (HDD) under an instruction of a user, or may be transmitted to an external host apparatus via the I/O controlling unit 113 and the network I/F 104, for example.

Further, the image processing apparatus 1 can be used as a copier with a similar manner using the information insertion controller 120. When the image processing apparatus 1 is a copier, the engine controlling unit 112 receives the scanned image data from the scanner 102, and the scanned image data is input to the information insertion controller 120 by the main controlling unit 111; or image information or data generated by the image processing unit 114 is input to the information insertion controller 120 by the main controlling unit 111. Accordingly, the scanned image data or image information generated by the image processing unit 114 can be used as the input information. The information insertion controller 120 conducts the above described information insertion process and generates an output information. Under a control of the main controlling unit 111, the engine controlling unit 112 drives the print engine 107 using the output information, generated by the information insertion controller 120, as similar to a printer.

Further, in the above-described process, a plurality of blank space lines may be used for inserting information at step S1302. However, if one piece of information (e.g., translation term) is divided in a plurality of lines and stored in PDF format or the like, and such translation term is to be searched, such translation term may not be searched because of such divided condition cannot be recognized as one term. Such an inconvenience may be caused when a translation term (i.e., interpretation information) is displayed by using a plurality of blank space lines at step S1302. To avoid such inconvenience, a plurality of blank space lines may not be used to display one translation term. Specifically, a translation term may be inserted within one line space by changing a font size. If the font size of translation term becomes less than the threshold size to fit the translation term in one line space, the translation term may be displayed as footnote. With such a configuration, a translation term may not be divided in a plurality of blank space lines, by which such translation term can be searched.

Further, in the above-described cases, the insertable area may have a width which is substantially matched to a width of the target word, which can be see in "document" and the corresponding insertable area of FIG. 14. However, the width of the insertable area may be set greater than the width of target word as shown in FIG. 20. In case of FIG. 20, no translation term is added to words which adjacently exist right before or after the target word.

Further, even if a translation term is added to words adjacently existing with respect to the target word, the width of the insertable area can be set greater than the width of target word as shown in FIG. 21.

Hereinafter, a method of modifying a dimension (e.g., width) of the insertable area is described, in which a dimension (e.g., width) of first insertable area set for a first interpretation information may be modified in view of a dimension (e.g., width) of adjacent insertable area set for another interpretation information, in which the first insertable area and the adjacent insertable area may be adjacent each other in one line, for example.

In FIG. 21, the width of the insertable area for interpretation information used for the word of "document" can be set greater than the width of "document." Then, an insertable area for the word of "original" existing right before the "document," and an insertable area for the word of "establishing" existing right after the "document" can be set to a width smaller than a width of "original" and "establishing." As such, the insertable area for the "document" can be set greater by reducing a space for the insertable area of the words existing right before or after the "document."

As such, the insertable area can be set greater for the word of "document" as shown in FIGS. 20 and 21. In case of FIG. 21, the insertable area for the words existing right before or after the "document" is set to a smaller value. If interpretation information for the words existing right before or after the "document" can be inserted in such smaller insertable area, text image can be read and understood easily by referring the interpretation information. Accordingly, in a case of FIG. 21, the information insertion processing unit 123 may modify or correct the insertable area set for the word of "original" and "establishing" adjacently existing to the target word of "document" in view of a length of interpretation information to be inserted for the adjacent words such as "original" and "establishing."

As above described, the information insertion processing unit 123 may adjust a size of insertable area as shown in FIGS. 20 and 21. Specifically, at step S1302 in FIG. 13, the information insertion processing unit 123 may modify or correct a width of the insertable area computed at step S1301 considering word(s) disposed adjacently right before or after the target word. Accordingly, the information insertion processing unit 123 can set a smaller width for the insertable area when a to-be-inserted interpretation information has a smaller width ("$F_W$" in FIG. 16); or the information insertion processing unit 123 can set a greater width for the insertable area when a to-be-inserted interpretation information has a greater width ("$F_W$" in FIG. 16). Such width adjustment for the insertable area may be conducted based on a width of term to be inserted into the insertable area. For example, as shown in case of FIGS. 14, 20, and 21, insertable areas for words of "original", "document", and "establishing" adjacently disposed each other can be adjusted.

Further, information display styles shown in FIGS. 18 to 21 can be combined as shown in FIG. 22. In FIG. 22, interpretation information for the words of "original" and "establishing" are inserted as footnotes, and interpretation information for the word of "document" is displayed in the insertable area. Such display style of FIG. 22 may be effectively used when a width for to-be-inserted interpretation information for each of adjacently existing words becomes greater. For example, the display style of FIG. 22 can preferably reduce a frequency of adding footnote in one document, by which the document can be easily read and understood. In general, if one document includes too many footnotes, such document may not be easily read and understood.

The display style of FIG. 22 may preferably use the footnote for a word that can be understood easily and has a lesser need for confirming interpretation information, and preferably use the insertable area for a word that is harder to understand and has a greater need for confirming a translation term (i.e., interpretation information). Such selective usage of different insertion style can be determined if difficulty level of information of terms (hereinafter, difficulty level of information) is added to each term stored in the interpretation information DB 109, for example. Accordingly, the information insertion processing unit 123 may refer to the difficulty level of information, and then determine to use an insertable area for displaying interpretation information having a higher difficulty level, and to use a footnote for displaying interpretation information having a lower difficulty level.

Further, as shown in FIG. 22, a plurality of meanings may be displayed for one target word because one target word may typically have a plurality of meanings. Such example will be described later as a second exemplary embodiment.

Further, in the above described case, an English sentence may be used as the input information, and Japanese translation term may be inserted in the English sentence (see FIGS. 10, 18, 19). Further, as shown in FIG. 5, input information written in another language (e.g., Japanese sentence) can used as the input information. If input information is English sentence or the like, each word in sentence can be separated one by one easily as shown in FIGS. 12 and 14. However, if input information is written in an inflected language (e.g., Japanese), such information may be hard to separate into each word compared to English. Accordingly, if a Japanese sentence is used as the input information, the information insertion processing unit 123 may conduct morphological analysis to elicit Japanese words at step S1103 of FIG. 11, by which the Japanese sentence can be inserted with a foreign translation term (e.g., English term) as similar when the English sentence is used as the input information. Such morphological analysis may be conducted by a known method.

Further, in the above described process, a footnote (used as a second insertable area) may be used to display given interpretation information correlated with a sign as shown in FIG. 19, in which the insertable area (used as first insertable area) is inserted with a sign or the like, and the sign and correlated interpretation information are displayed in footnote (second insertable area). However, if a blank space (used as first insertable area) between sentences is too small, even a sign cannot be inserted between sentences. In light of such situation, FIG. 23 shows another example case, in which, a target word is underlined to indicate that the target word is attached with a translation term or explanatory note. As shown in FIG. 23, the target word and its translation term are correlated in a footnote. Such display style may include only underline in a main text portion, and information to help understanding the sentence can be inserted as footnote.

In FIG. 23, the target word is underlined to indicate that the target word is attached with a translation term or explanatory note. Further, instead of the underlining, a font type of target word may be changed, a color of target word may be changed, or a bold letter may be used for a target word to indicate that the target word is attached with a translation term or explanatory note, for example. Such highlighting process shown in FIG. 23 can be conducted by the information insertion processing unit 123 by referring a dimension (e.g., width) of the insertable area computed at step S1301 of FIG. 13.

In the above described cases, image information or data used as the input information may be generated by a print job command, a scanning operation, or a copying operation, which may need a conversion of graphic data to text data as described with reference to FIG. 4. However, the input information may be a document having encoded text information. In such a case, step S1102 of FIG. 11 can be omitted.

Further, in the above described process, at step S1301 of FIG. 13, the insertable area is computed using the word display area information shown in FIG. 12. However, the input information may include blank space information between adjacent lines as "format information" of document. In such a case, the information insertion processing unit 123 can compute the insertable area easily using the "format information" at step S1301 of FIG. 13. Such "format information" for blank space area between adjacent lines may be included in image data, and used when to display an image on a monitor of personal computer, or when to output an image by a printing operation.

Further, in the example case of FIGS. 18 and 19, the interpretation information is displayed starting from a left end side of the insertable area. However, the interpretation information can be displayed at a center portion of the insertable area using the information insertion processing unit 123 by adjusting an insertion style.

Further, in the above described process, as shown in FIG. 10, the input information may be composed of strings of black characters displayed on a white background. However, the background color and color of characters of the input information is not limited to white and black. Accordingly, the information insertion processing unit 123 may preferably conduct a given process depending on the background color and color of characters of the input information. For example, in FIG. 4, black color characters are elicited to recognize characters. However, other colored characters can be elicited by changing the color of characters in view of the background color and the color of characters used in the input information. The color of characters to be elicited can be changed manually by a user, or by detecting the color of characters using a sensor and the information insertion processing unit 123.

Further, in the above described process, as shown in FIG. 14, the insertable area may be set between one line including a target word and a subsequent adjacent line. Further, the insertable area can be set between one line including a target word and a preceding adjacent line.

In the first exemplary embodiment, as shown in FIG. 17, the information insertion processing unit 123 retrieves one translation term (i.e., interpretation information) for one target word. However, one word may not be correlated to only one translation term. In a second exemplary embodiment, the interpretation information DB 109 stores a plurality of meanings as interpretation information for one word.

FIG. 24 shows example information stored in the interpretation information DB 109 according to a second exemplary embodiment. As shown in FIG. 24, the interpretation information DB 109 stores a plurality of meanings as interpretation information for a word of "original." In such a case, the information insertion processing unit 123 may retrieve a plurality of translation terms as interpretation information at step S1106 of FIG. 11. Then, at step S1302 and step S1303 of FIG. 13, a plurality of meanings may be displayed as interpretation information using a corresponding insertion style.

In a second exemplary embodiment, at step S1302 and step S1303, the information insertion processing unit 123 determines an information insertion style. Specifically, the information insertion processing unit 123 determines whether all interpretation information retrieved from the interpretation information DB 109 can be fit in the insertable area using a font size equal to or greater than a threshold size. If it is determined that all interpretation information can be fit, the information insertion processing unit 123 inserts all retrieved interpretation information to the insertable area. FIG. 25 shows an example that the all retrieved interpretation information is inserted in the insertable area.

On one hand, if it is determined that all retrieved interpretation information cannot be fit in the insertable area using a font size equal to or greater than a threshold size, the information insertion processing unit 123 may delete one of the retrieved interpretation information to reduce the number of interpretation information to display, and may determine a modified information insertion style. After such deletion process, if the information insertion processing unit 123 determines that the number reduced interpretation information can be fit in the insertable area, step S1306 of FIG. 13 is conducted. FIG. 26 show such example case that some of the meanings shown in FIG. 24 is deleted when to insert translation terms in the main text. In case of FIG. 26, two translation terms ""原作 (pronounced "gensaku" meaning "Original book" in Japanase)" and "独創的な人(pronounced "dokuso teki na hito" meaning "person having originality" in Japanase)" are deleted from a plurality of translation terms shown in FIG. 24 so that the remaining translation terms can be inserted in the main text as shown in FIG. 26.

Further, if it is determined that the interpretation information cannot be fit in the insertable area even if the number of retrieved interpretation information is reduced to one translation term, the information insertion processing unit 123 conducts a process at step S1305 of FIG. 13 (i.e., use footnote).

With such a process, even one target word can be corresponded to a plurality of meanings, which may be stored in the interpretation information DB 109 as interpretation information, the number of interpretation information that can be inserted in the main text can be set greater as much as possible as above described.

Further, in the above described process, if all retrieved interpretation information cannot be fit in the insertable area using a font size equal to or greater than a threshold size, the information insertion processing unit 123 may delete one of the retrieved interpretation information. When deleting interpretation information, the information insertion processing unit 123 may determine the deleting order of interpretation information based on a width and a height of the insertable area, for example. If an area required to insert interpretation information using a font size equal to a threshold size is slightly greater than the insertable area, the information insertion processing unit 123 may delete one or more interpretation information composed of a shorter length of letters or characters; on one hand, if an area required to insert interpretation information using a font size equal to a threshold size is significantly greater than the insertable area, the information insertion processing unit 123 may delete one or more interpretation information composed of a longer length of letters or characters.

Further, if the interpretation information DB 109 stores a plurality of meanings for one word as shown in FIG. 24, priority order may be set for each of the plurality of meanings. If such priority order is set, the information insertion processing unit 123 may delete a meaning having the lowest priority order at first, for example. With such a setting, a translation term having a higher priority order can be inserted.

Further, the information insertion processing unit 123 may select any one of translation terms from a plurality of translation terms based on information of the insertable area computed at step S1301 of FIG. 13. For example, as shown in FIG. 27, the information insertion processing unit 123 may select a translation term having a longer length if the insertable area has a greater area. On one hand, as shown in FIG. 28, the information insertion processing unit 123 may select a translation term having a shorter length if the insertable area has a smaller area. FIGS. 27 and 28 show such insertable area using a dashed line.

Further, when a plurality of meanings used as interpretation information are retrieved, all retrieved meanings may be inserted in an insertable area. In such a case, the information insertion processing unit 123 may not conduct a deleting process for the plurality of meanings, but a plurality of meanings (e.g., translation terms) may be used as interpretation information in a process shown in FIG. 13.

As above described, in a second exemplary embodiment, the image processing apparatus 1 can preferably insert interpretation information (e.g., translation term), which can help the understanding of the input information (e.g., English sentence), in a main text even if a plurality of meanings (e.g., translation term, explanatory note) are retrieved for one target word as interpretation information.

As above described, in exemplary embodiments, acquired image data can be output by adding given information corresponded to given character information included in the image data while easily maintaining a format configuration of the acquired image data with the above described method of image processing.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An information processing apparatus for processing image data including character information, the processing of image data including a process of inserting interpretation information corresponding to the character information in the image data, the information processing apparatus comprising:

an image data acquisition unit to acquire the image data including the character information, the character information being composed of a plurality of characters having a first string of characters;

an interpretation information retrieval unit to retrieve first interpretation information to be attached to the first string of characters;

an area information definition unit to compute insertable area information on a first insertable area usable for inserting the first interpretation information, the first insertable area being defined by coordinate data of characters in the acquired image data; and an insertion style determination unit to determine an insertion style of the first interpretation information based on the insertable area information, the insertion style including conditions for inserting the first interpretation information.

2. The information processing apparatus according to claim 1, wherein the insertion style determination unit determines the insertion style based on the insertable area information on the first insertable area, and the determined insertion style is applied to fit the first interpretation information within the first insertable area.

3. The information processing apparatus according to claim 2, wherein the insertion style determination unit includes a font size determination unit to determine a font size as one condition of the insertion style, and the determined font size is used for displaying the first interpretation information.

4. The information processing apparatus according to claim 3, wherein
the font size determination unit determines a given value for the font size that sizes the first interpretation information to fit within the first insertable area, and
the insertion style determination unit determines whether the first interpretation information is insertable in the first insertable area with the determined font size by comparing the determined font size and a threshold size value for font size set in advance.

5. The information processing apparatus according to claim 4, wherein, when the determined font size to be used for displaying the first interpretation information is smaller than the threshold size value, the insertion style determination unit determines to insert the first interpretation information not in the first insertable area but in a second insertable area different from the first insertable area.

6. The information processing apparatus according to claim 1, wherein the insertion style determination unit determines a number of blank space lines settable for the first insertable area as one condition of the insertion style.

7. The information processing apparatus according to claim 1, wherein
the interpretation information retrieval unit retrieves a plurality of meanings as the first interpretation information for the first string of characters,
the insertion style determination unit selects at least one meaning from the plurality of meanings, and determines an insertion style for the selected meaning to be attached to the first string of characters.

8. The information processing apparatus according to claim 1, wherein
the insertion style determination unit modifies a dimension of the first insertable area set for the first string of characters based on a dimension of second interpretation information corresponding to a second string of characters adjacent to the first string of characters.

9. The information processing apparatus according to claim 1, wherein the area information definition unit defines the first insertable area in a blank space area adjacent to the first string of characters.

10. The information processing apparatus according to claim 1, wherein
the area information definition unit defines the first insertable area between a first line including the first string of characters and a second line adjacent to the first line.

11. The information processing apparatus according to claim 10, wherein the area information definition unit defines a width of the first insertable area usable for inserting the first interpretation information.

12. The information processing apparatus according to claim 1, wherein the area information definition unit defines a peripheral limit of the first insertable area usable for inserting the first interpretation information.

13. The information processing apparatus according to claim 1, wherein the area information definition unit defines coordinate data for the first insertable area usable for inserting the first interpretation information.

14. The information processing apparatus according to claim 1, wherein the interpretation information retrieval unit retrieves a translation term as the first interpretation information for the first string of characters.

15. The information processing apparatus according to claim 1, wherein the interpretation information retrieval unit retrieves an explanatory note as the first interpretation information for the first string of characters.

16. A method of processing image data including character information, the processing of image data including a process of inserting interpretation information corresponding to the character information in the image data, the method comprising:
acquiring the image data including the character information composed of a plurality of characters having a first string of characters;
retrieving first interpretation information to be attached to the first string of characters;
computing insertable area information on a first insertable area usable for inserting the first interpretation information, the first insertable area being defined by coordinate data of characters in the acquired image data; and
determining an insertion style of the first interpretation information based on the insertable area information,
the insertion style including conditions for inserting the first interpretation information.

17. A non-transitory computer-readable medium storing a program for processing image data including character information, the program comprising computer-readable instructions that, when executed by a computer, instruct a controller to execute a method of processing of image data including a process of inserting interpretation information corresponding to the character information in the image data, the method comprising the steps of:
acquiring the image data including the character information composed of a plurality of characters having a first string of characters;
retrieving first interpretation information to be attached to the first string of characters;
computing insertable area information on a first insertable area usable for inserting the first interpretation information, the first insertable area being defined by coordinate data of characters in the acquired image data; and
determining an insertion style of the first interpretation information based on the insertable area information,
the insertion style including conditions for inserting the first interpretation information.

* * * * *